United States Patent
Colonna et al.

(10) Patent No.: US 8,857,399 B2
(45) Date of Patent: Oct. 14, 2014

(54) COUNTER ROTATING MASS SYSTEM CONFIGURED TO BE APPLIED TO AN INLINE-FOUR INTERNAL COMBUSTION ENGINE TO BALANCE THE VIBRATIONS PRODUCED BY SAID ENGINE, AND INLINE-FOUR ENGINE COMPRISING SAID SYSTEM

(75) Inventors: Giuseppe Colonna, Pianezza (IT); Loris Aere, Turin (IT)

(73) Assignee: FPT Industrial S.p.A., Turin (IT)

( * ) Notice: Subject to any disclaimer, the term of this patent is extended or adjusted under 35 U.S.C. 154(b) by 0 days.

(21) Appl. No.: 13/261,373

(22) PCT Filed: Feb. 9, 2011

(86) PCT No.: PCT/IB2011/050543
§ 371 (c)(1),
(2), (4) Date: Jul. 19, 2012

(87) PCT Pub. No.: WO2011/098956
PCT Pub. Date: Aug. 18, 2011

(65) Prior Publication Data
US 2012/0291742 A1 Nov. 22, 2012

(30) Foreign Application Priority Data
Feb. 9, 2010 (EP) .................................... 10425026

(51) Int. Cl.
*F02B 75/06* (2006.01)
*F16F 15/26* (2006.01)

(52) U.S. Cl.
CPC .................................... *F16F 15/265* (2013.01)
USPC ....................... 123/192.2; 123/52.1; 123/58.1

(58) Field of Classification Search
USPC .......................... 123/192.2, 192.1, 52.1, 58.1
See application file for complete search history.

(56) References Cited

U.S. PATENT DOCUMENTS

| 5,083,535 A | * | 1/1992 | Deschler et al. ............ 123/192.2 |
| 5,305,656 A | * | 4/1994 | Kamiya et al. .................. 74/604 |
| 5,535,643 A | * | 7/1996 | Garza ............................. 74/603 |
| 5,791,309 A | * | 8/1998 | Yamazaki et al. .......... 123/192.2 |
| 6,189,499 B1 | * | 2/2001 | Iwata et al. ................. 123/192.2 |
| 7,020,528 B2 | * | 3/2006 | Neev ............................. 607/100 |
| 8,020,528 B1 | * | 9/2011 | Phillips et al. ............. 123/192.2 |
| 8,047,175 B2 | * | 11/2011 | Nishi et al. ................. 123/192.2 |
| 2003/0106518 A1 | * | 6/2003 | Purcell et al. ............. 123/192.2 |
| 2007/0079786 A1 | * | 4/2007 | Osman ....................... 123/192.2 |
| 2007/0289567 A1 | * | 12/2007 | Eto et al. .................... 123/192.1 |
| 2010/0139605 A1 | * | 6/2010 | Shin et al. .................. 123/192.2 |
| 2010/0147248 A1 | * | 6/2010 | Neal ............................ 123/192.2 |

FOREIGN PATENT DOCUMENTS

| CN | 201149065 | 11/2008 |
| DE | 10349201 | 6/2005 |
| EP | 0462411 | 12/1991 |
| EP | 0789164 | 8/1997 |
| GB | 2138890 | 10/1984 |
| WO | WO 99/42742 | 8/1999 |

* cited by examiner

*Primary Examiner* — Noah Kamen
*Assistant Examiner* — Long T Tran
(74) *Attorney, Agent, or Firm* — Stetina Brunda Garred & Brucker

(57) ABSTRACT

A balancing system configured to be applied to an inline-four internal combustion engine is disclosed. The balancing system comprises counter rotating eccentric masses (22, 23, 24, 25) projecting from the opposite side of a support (21). The support (21) is placed centrally under the driving shaft, being fixed by screws to the wall of the engine.

11 Claims, 9 Drawing Sheets

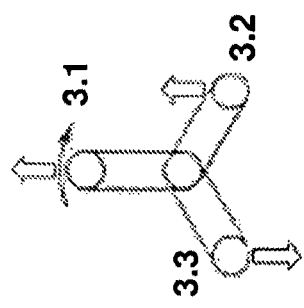
FIG. 1
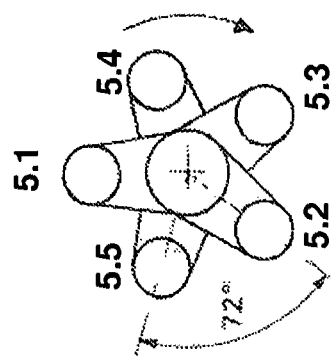
FIG. 2
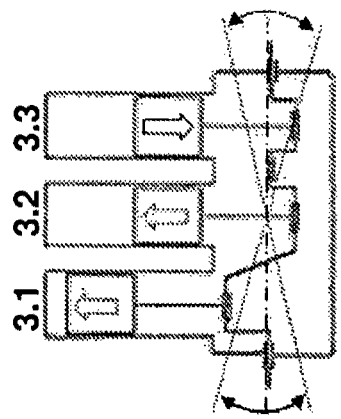
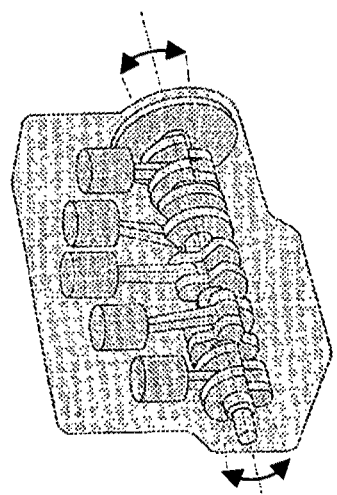

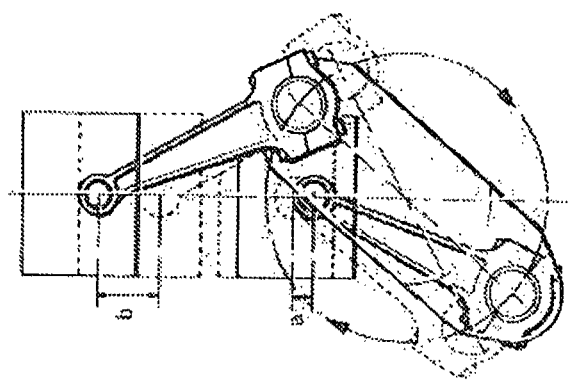
FIG. 3.2
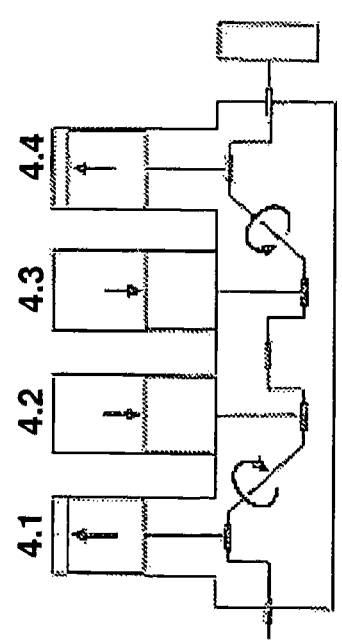
FIG. 3.1
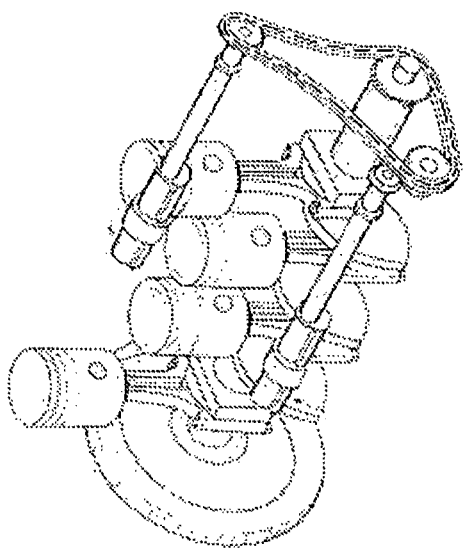
FIG. 4

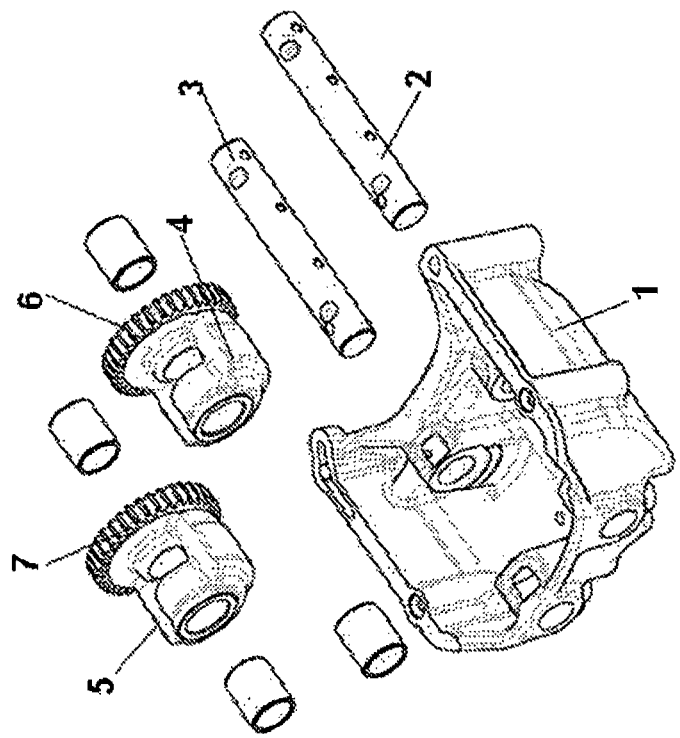
FIG. 5.2
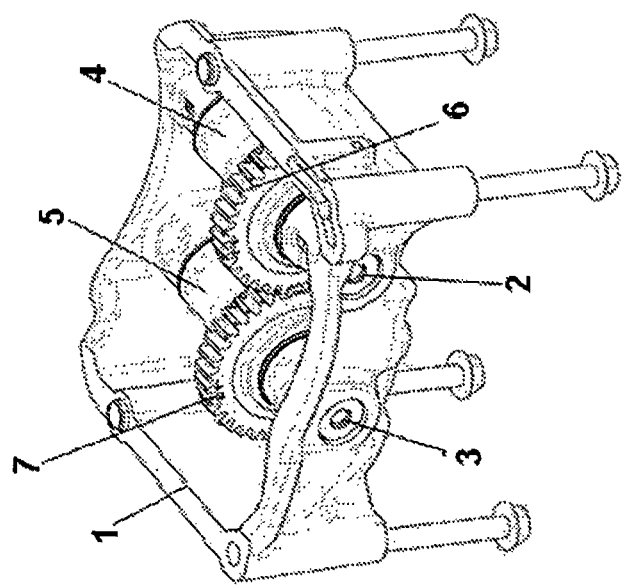
FIG. 5.1

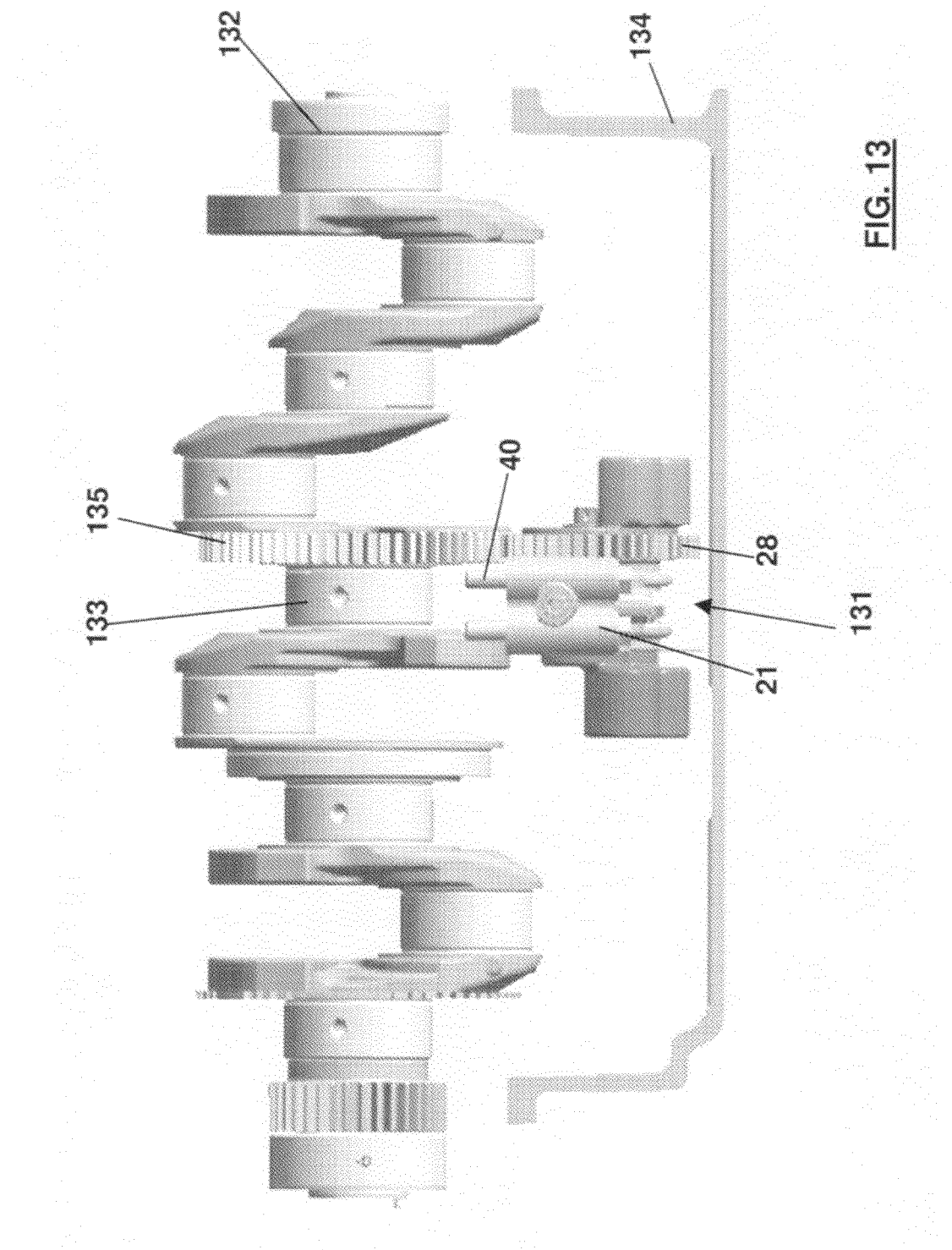

COUNTER ROTATING MASS SYSTEM CONFIGURED TO BE APPLIED TO AN INLINE-FOUR INTERNAL COMBUSTION ENGINE TO BALANCE THE VIBRATIONS PRODUCED BY SAID ENGINE, AND INLINE-FOUR ENGINE COMPRISING SAID SYSTEM

APPLICATION FIELD OF THE INVENTION

The present invention refers to a counter rotating mass system configured to be applied to an inline-four internal combustion engine to balance the vibrations produced by said engine, and an inline-four engine comprising said system.

DESCRIPTION OF THE PRIOR ART

The application of a counter rotating mass system to an engine is known in the art for balancing the vibrations and the inertias produced by the drive shaft in order to eliminate or at least to considerably reduce them. Said system is usually fixed to the crankcase or to the crankcase sump under the engine, anyway to a point where the balancing is necessary, and where it is possible to take the control of the mass rotation from the drive shaft. Balancing the vibrations produced by an inline-four engine presents, however, different problems with respect to other cylinder alignment configurations.

For example, an inline-three engine is described in the following, whose behavior is similar to an inline-five engine, both having an odd number of cylinders.

In an inline-three engine, the explosion occurs at each 240° of rotation the driving shaft (720°/3=240°). The driving shaft is schematized in FIG. 1, with ignition order: 3.1-3.3-3.2.

At a first analysis, it may seem that, during its rotation, the center of gravity of the three pistons and their respective connecting rods is always at the center of the engine, thus they do not generate any vibration. The analysis may also lead to believe there are no spurious forces, both vertically and transversally generated. This, however, is not correct, because it implies the assumption that the engine is a single point and the forces are acting on a single plane. The forces have, on the contrary, a different collocation along the shaft itself and, instead of being reciprocally cancelled out, they generate resultants that make the driving shaft vibrate at the two ends, generating first-order free moments, of the type "pitching".

FIG. 1 clearly shows that when piston 3.1 is at its upper dead center and inverts its motion downwards, it generates an upward force at the front end of the engine; piston 3.2 moves downwards and it generates an upward force positioned at the center of the engine; on the contrary, piston 3.3, which moves upwards, generates a downward force positioned at the rear end of the engine.

Since the axial center of gravity of the engine is positioned over the middle cylinder 3.2, a longitudinal "clockwise" moment is generated on the driving shaft, due to the fact that cylinder 3.1 pushes upwards and cylinder 3.3 pushes downwards. After a rotation of 180°, the situation is completely reversed, and the moment generated by pistons 3.1, 3.3 is inverted and becomes "counterclockwise".

The solution usually provided to counterbalance such moments on an inline-three engine is to apply a balance shaft driven by the driving shaft with two eccentric masses at the two ends of the shaft. The two masses move in a direction opposite to the piston's direction. Thus the "pitching" moment is balanced by an equal and opposite moment.

In an inline-five engine occur the same phenomena as in the inline-three engine.

An inline-five engine, the explosion occurs at each 720°/5=144° of the driving shaft rotation. As shown in FIG. 2, the ignition order is 5.1-5.3-5.5-5.4-5.2.

The resultants of the first-order alternate forces are balanced.

The resultants of the second-order alternate forces are balanced as well.

On the contrary, an inline-five engine generates "pitching" longitudinal moments similar to the ones of an inline-three engine. This happens because piston 5.1 is not in the same position as piston 5.5 and piston 5.2 is not in the same position as piston 5.4.

For this reason, the two ends of the engine vibrate with respect to the center of the engine.

A solution that is usually provided to counterbalance such moments on an inline-five engine is to apply, as in the case of the inline-three engine, a balance shaft which rotates in a direction opposite to the driving shaft, has the same length as the engine and two counterweights moving in a direction opposite to that of the pistons. The shaft is driven by the engine at the same speed as the driving shaft.

Or, as described in EP-462411, pairs of counter rotating masses may be applied at the two ends of the driving shaft. The solutions provided in the aforementioned cases, however, cannot be applied in case of an inline-four engine, where the generated vibrations are of a completely different type.

FIG. 3.1 shows the diagram of an inline-four engine, whose ignition order is: cylinder 1 (4.1)-cylinder 3 (4.3)-cylinder 4 (4.4)-cylinder 2 (4.2).

The ignition occurs each 720°/4=180° of the driving shaft rotation, thus the pairs of pistons 4.1-4.4 and 4.2-4.3 are exactly in the same position and always move according to the same direction. In order to avoid the pitching phenomenon, cylinders are arranged as in the figure, thus piston 4.1 is perfectly balanced by 4.4, and piston 4.2 is balanced by 4.3.

Thus it is possible to say that an inline-four engine does not need to balance the first-order free moments, due to the opposed reciprocal movements of the four cylinders. As for the vertical forces, it may be seen that piston 4.1 is balanced by piston 4.2 and piston 4.3 by piston 4.4. This, however, is valid only for first-order alternate forces. Second-order alternate forces are much smaller than first-order ones and rotate at twice the frequency of the first-order ones and their application point coincides with the center of the engine. If said forces intensify so as to provoke a resonance phenomenon, they may even break the driving shaft.

The phenomenon may be explained with reference to FIG. 3.2.

In an inline-four engine, both the linear movement of the pistons and the angular movement of the connecting rods are such that the piston which is moving in the upper part of the cylinder (towards the upper dead center) has a displacement (b) along the cylinder axis higher than the displacement (a) of the piston moving in the lower part (towards the lower dead center), being the angular displacement the same.

Such difference of displacement is such that the piston moving in the upper part generates a force along the cylinder axis higher than the force, having opposite direction, generated by the piston moving in the lower part. The resultant force is, as said above, a second-order force which rotates at twice the speed of the driving shaft.

The longer is the stroke, and the heavier are the piston and the connecting rod, the more important are the second-order alternate forces to be balanced.

This occurs in particular on engines that are part of the load bearing structure of the vehicle, as for example in a tractor or in earthworks machines. Indeed in such cases the engine produces strong vibrations that need to be balanced. Solutions suitable for dampening the vibrations induced by second-order alternate forces in an inline-four engine are known in the art, applying eccentric masses so that their center of gravity is as near as possible to the center of the engine.

In an example of known solution (FIG. 4), two counter rotating shafts are applied, driven by the driving shaft and rotating at twice its speed, of the type "distributed" along the whole length of the engine. Such solution has problems deriving from its weight and its bulk.

In another example of known solution, a system of the type shown in FIGS. 5.1 and 5.2 is applied.

The system is provided with a sump having a closed rigid body 1, for example made of cast iron, which contains two shafts 2, 3 pivoted to the two ends of the sump supporting them. Two eccentric masses 4, 5, with their respective gear wheels 6, 7 engaging with each other and thus determining the counter rotation, are mounted on the shafts by means of appropriate bearings or bushes. Generally the motion of the drive shaft is transmitted to one of the two gear wheels, for example by means of gears. Moreover, an internal canalization system is usually present in order to bring oil for lubricating the two counter rotating masses which rotate at high speed, typically twice the RPM of the engine. The whole system is fixed to the engine by screws. Also a system of this type known in the art has problems deriving from its weight and its bulk. For example, the sump is a rigid body made of cast iron, thus very heavy and bulky. The pre-assembling of such a system takes long time, and consequently has high production costs.

SUMMARY OF THE INVENTION

Therefore the aim of the present invention is to overcome all the aforementioned drawbacks and to provide a counter rotating mass system configured to be applied to an inline-four internal combustion engine for balancing the second-order alternate forces generated on the driving shaft of said engine, having a lower weight, bulk, costs.

The idea at the basis of the present invention is to realize a counter rotating eccentric mass system projecting from the opposite sides of a central support.

The system is preferably applied in the middle, under the driving shaft.

This system is considerably simpler than the systems known in the art, since the eccentric masses project from the two sides of a central support that is very simple and compact.

The present invention refers in particular to a counter rotating mass system configured to be applied to an inline-four internal combustion engine to balance the vibrations produced by said engine, and inline-four engine comprising said system, as described more fully in the claims, that are an integral part of the present description.

BRIEF DESCRIPTION OF THE FIGURES

Further purposes and advantages of the present invention will become clear from the following detailed description of a preferred embodiment (and its alternative embodiments) and the drawings that are attached hereto, which are merely illustrative and non-limitative, in which:

FIGS. 1 and 2 show a schematization of, respectively, inline-three and inline-five engines;

FIG. 3.1 shows a schematization of an inline-four engine;

FIG. 3.2 shows a schematization of the movement of a piston in the inline-four engine;

FIG. 4 shows a schematization of a balancing system of the type known in the art, described above, that can be applied to an inline-four engine;

FIGS. 5.1 and 5.2 show a further balancing system of the type known in the art, as described above, that can be applied to an inline-four engine, respectively according to an assembled and an exploded view;

FIG. 13 shows an example of collocation of the system that is object of the invention on an inline-four four engine.

In the figures the same reference numbers and letters identify the same elements or components.

DETAILED DESCRIPTION OF PREFERRED EMBODIMENTS OF THE INVENTION

Figure 6:
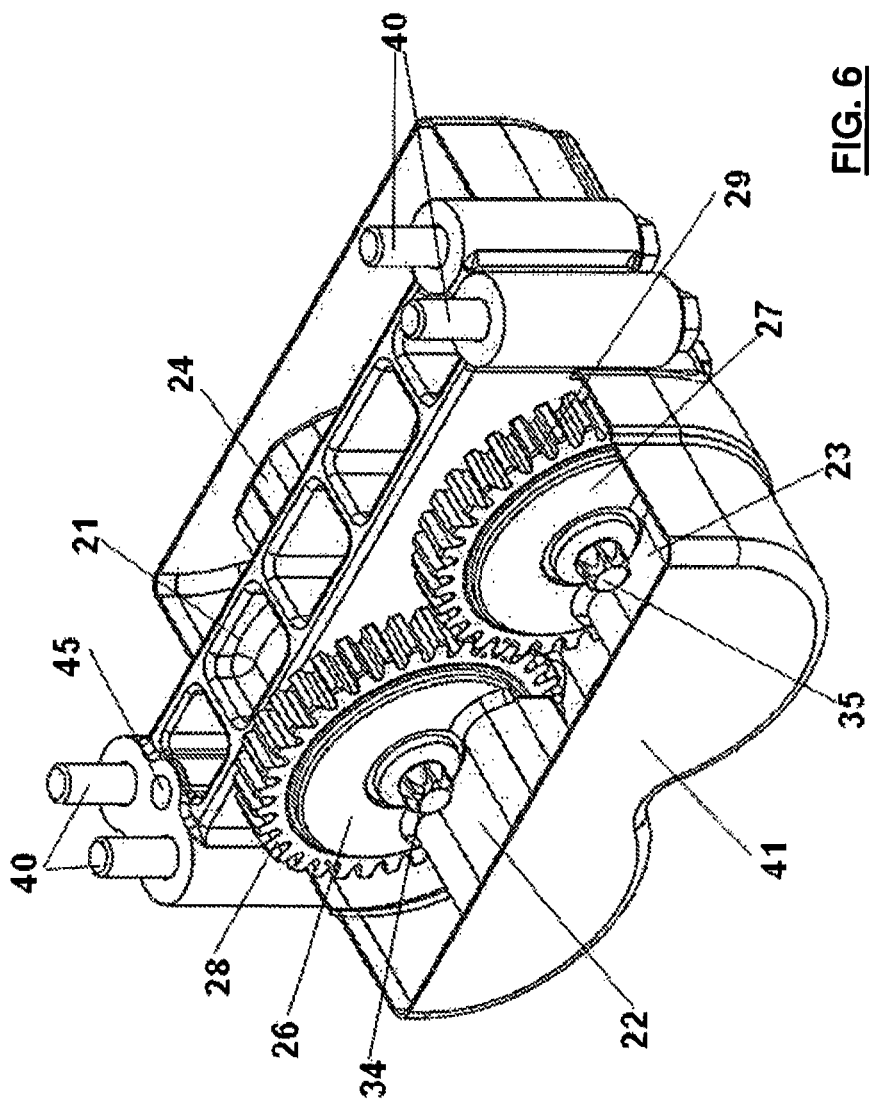
FIGS. 6 and 7 show a first embodiment of a counter rotating mass system according to the present invention, that can be applied to an inline-four engine, respectively according to an assembled and an exploded view.
Figure 7:
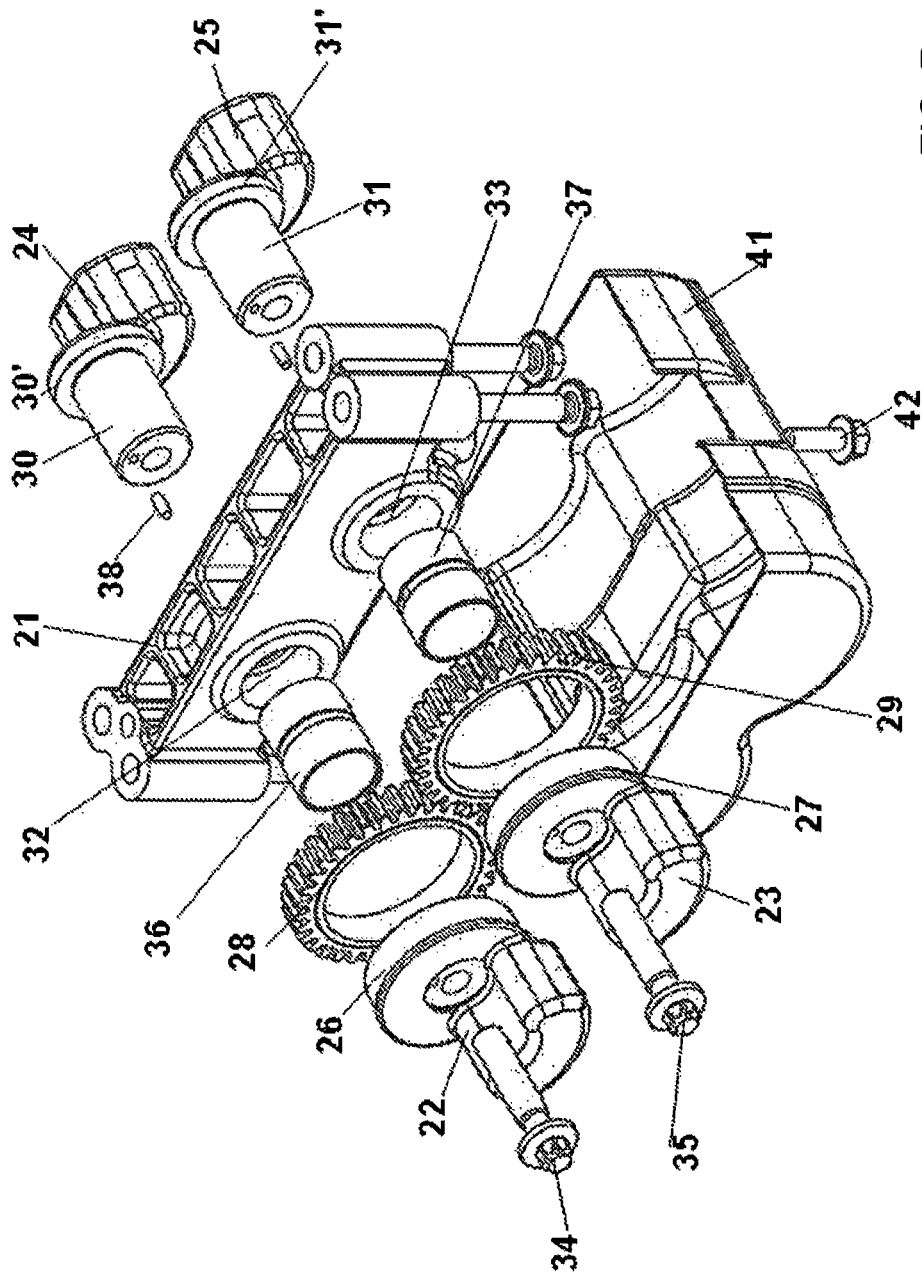
Figure 8:
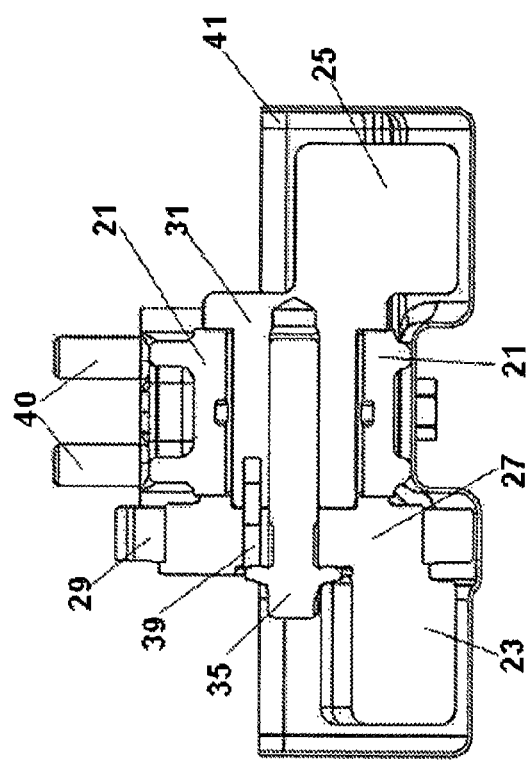
FIGS. 8, 9, and 10 show further views of the system of FIGS. 6 and 7, respectively according to a longitudinal section on the plane of the masses, according to a cross section in correspondence of middle of the support, and according to a view in a plan.

As said above, the idea at the basis of the present invention is to realize a central support having low weight and small bulk, with counter rotating eccentric masses projecting from the two sides of the support.

With reference to figures from 6 to 13, a central support 21 is shown, suitable for supporting two pairs of counter rotating eccentric masses 22, 23 and 24, 25, being at the two opposite sides of the support.

The eccentric masses 22 and 23 on one side of the support are held by the respective hubs 26, 27, on which the driving means of the mass rotation are fixed. In this example they comprise wheel gears 28 and 29, suitable to engage with each other in order to determine the counter rotation of the masses.

The eccentric masses 24 and 25 from the other side of the support are held by the respective shafts 30, 31.

The support 21 is provided with two through cross holes 32 and 33, which allow the shafts 30 and 31 to pass through, such shafts being coaxially fixed to the hubs 26, of the respective masses on the opposite side, for example by means of tightening screws 34, 35.

In order to ensure the correct rotation and to avoid friction, an appropriate backlash is realized between the lateral sides of the support and the sides of the hubs and of the shafts that face them. Moreover, appropriate shoulders 30', 31' are present on the edges of the shafts.

In order to guarantee the correct rotation phase, centering pins 38, 39 are preferably present and fit in appropriate blind holes on the terminal sides of the shafts 30, 31 and in corresponding contact points of the hubs 26, 27.

Bushes 36, 37 are preferably present and are inserted in the holes 32, 33 in order to facilitate the rotation of the shafts 30, 31 and to minimize the friction.

The support comprising the elements described above is fixed to the engine by screws 40, and an appropriate gear of the drive shaft (not shown in the figures), connected to one of the gear wheels, drives the rotation of the masses.

A lower protection sump 41 is fixed to the support 21 for example by means of screws 42.

Figure 9:
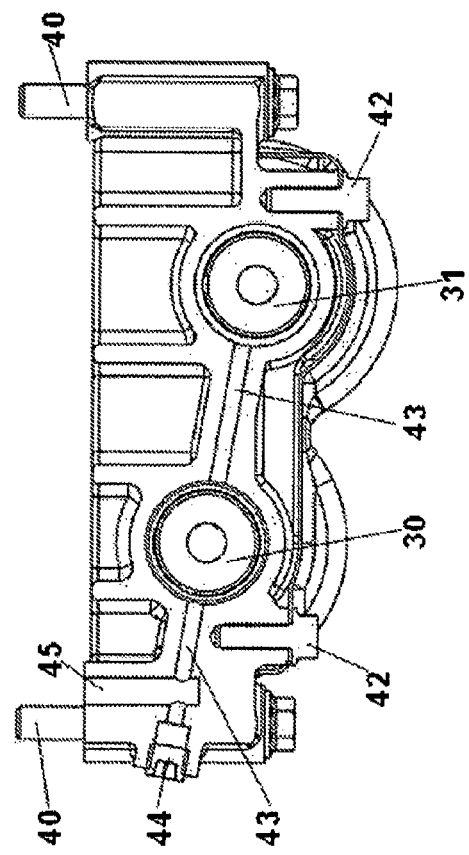
Figure 10:
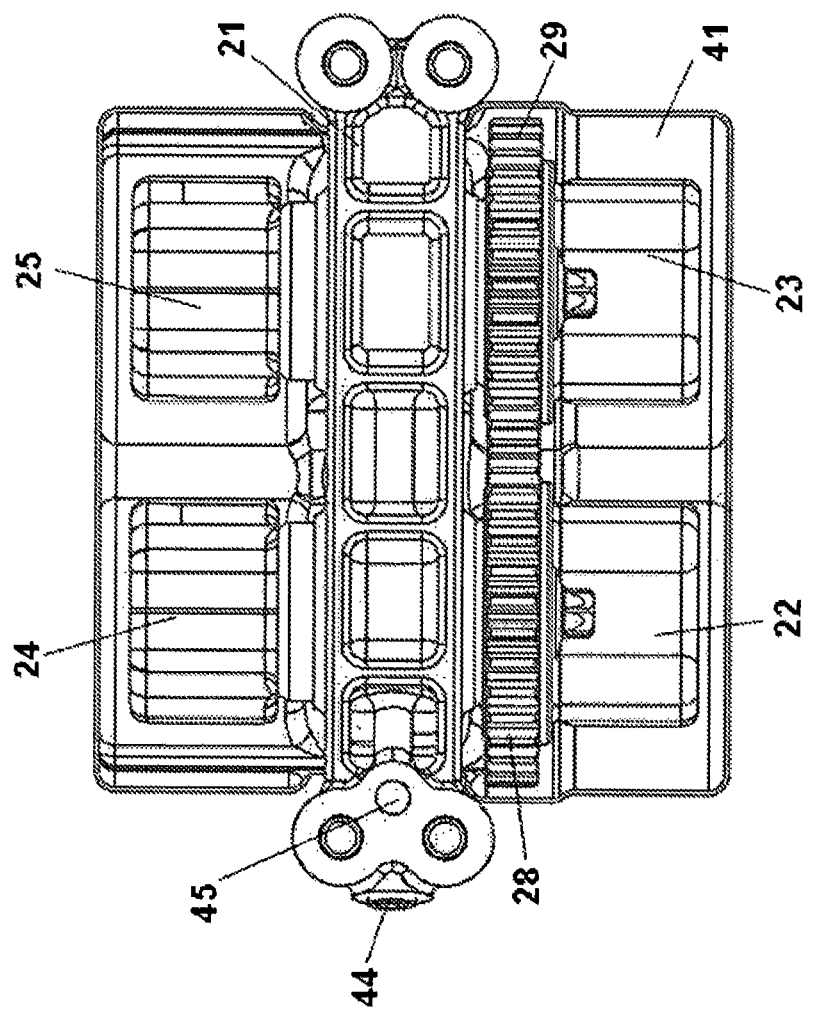

With reference to FIG. 9, a canalization 43 internal to the support 21 may be present in order to bring lubricating oil to the bushes 36, 37, which are preferably provided with a groove placed in correspondence of the canalization in order to facilitate the introduction of the oil. A plug 44 may be applied from the outside in order to close the external access to the canalization. A hole 45 may also be present on the upper side of the support 21, in order to connect the oil canalization 43 to an appropriate oil delivery on the crankcase of the engine, interfacing with the mass unit.

Figures 11, 12:
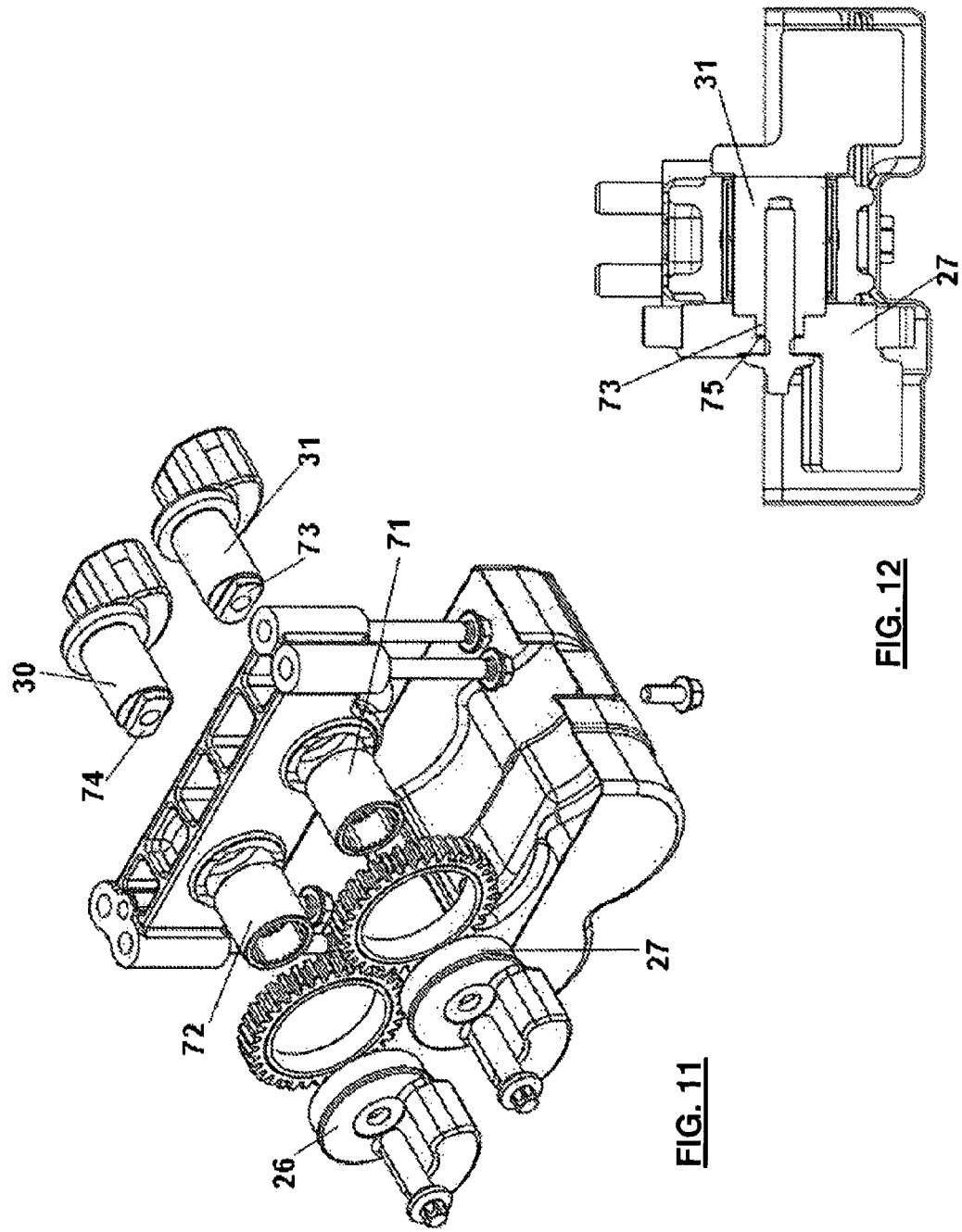
FIGS. 11 and 12 show a second embodiment of a counter rotating mass system according to the present invention, that can be applied to an inline-four engine, with rolling bearings replacing sliding bushes, respectively according to an exploded view and a cross section view.

In a possible alternative embodiment shown with reference to the FIGS. 11 and 12, roller bearings 71, 72 may be present instead of the bushes. In this case lubrication may be unnecessary and therefore it is possible to avoid the internal canalization of the support.

Moreover, in order to ensure the transmission of a higher torque, if necessary, and to ensure the correct rotation phase of the masses, raised parts 73, 74 may be present, for example on the terminal side of the shafts 30, 31, fitting in corresponding recesses 75, 76 in the hubs supporting the masses. Of course, the opposite arrangement of raised parts and recesses is also possible.

FIG. 13 shows an example of collocation of the system that is object of the invention on an inline-four four engine. The system, globally indicated by the reference 131 is placed in the middle under the driving shaft 132. The support 21 is fixed by screws 40 to the fixed wall of the engine (not shown in the figures) under the central support bank 133. A specially provided gear 135 is present on the driving shaft and generates the rotation of the gear wheel 28 of the system, so that the masses rotate at twice the frequency of the driving shaft.

Number 134 indicates the profile of the oil sump, which contains also the system 131. The lower protection sump 41 may be not present, as in this case.

The central position of the system is preferred, since it simplifies design, manufacturing and installation of the system, since the eccentric masses may have the same magnitude on the two opposite sides of the support. The system may also be installed in a decentralized position, nearer to a side of the driving shaft. In this case it is necessary to recalculate the balancing of the rotating masses, proportionally to the magnitude of the lateral displacement.

Compared to the systems known in the art, a heavy and bulky sump having a rigid body is no longer necessary for supporting the masses, instead there is only a central support 21, which may be made of a lighter material, for example aluminium, which is fixed to the crankcase.

The possibly present lower sump 41 does not have any load bearing function, but it only has a protection function, and therefore it may be made of a lighter material as well, such as metal plate or plastic. Moreover the hermetic seal of the sump is not necessary, while in the system known in the art the rigid body sump is hermetically sealed.

The rotation drive of the masses by means of gears and wheel gears, may be replaced by a different drive, for example by means of belts and pulleys or chain.

The counter rotating masses on one side of the support are in phase with the ones on the other side, and they do not necessarily have the same shape, but they may be different.

The masses have to be made of a material which resists to high RPM, for example high-duty cast iron or pressed steel.

It will be apparent to the person skilled in the art that other alternative and equivalent embodiments of the invention can be conceived and reduced to practice without departing from the scope of the invention.

The advantages deriving from the use of this invention are evident, with respect to the solutions known in the art.

The new solution is compact and simple, with a monolithic support and simple machining replacing a complex case; thus the overall weight is remarkably reduced, even by 50%, and the longitudinal bulk is also reduced, even by 20%.

Assembling is easier, with a considerable reduction of the costs. Masses are mounted from the outside of the support by means of simple procedures and a reduced number of operations; on the contrary in the systems known in the art, masses, shafts and bushes have to be mounted from the inside of the sump by using complex and time-consuming assembling procedures.

Since the system is so compact, it is possible to easily integrate additional functions to the system, such as: oil pump, suction rose, oil delivery canalization to the crankcase.

More standardization opportunities are possible.

From the description set forth above it will be possible for the person skilled in the art to embody the invention with no need of describing further construction details.

The invention claimed is:

1. A balancing system configured to be applied to an inline internal combustion engine to balance second-order alternate forces produced on a driving shaft of said engine, said engine comprising:
   four cylinders having ignition sequence 1-3-4-2; and
   an engine oil sump,
   said balancing system comprising:
      two pairs of counter rotating eccentric masses; and
      a central support defining two opposite sides from where said two pair of counter rotating eccentric masses project, said central support being directly attachable to an external structure;
   two gears, each placed coaxially to a respective pair of counter rotating eccentric masses, said gears being placed inside said oil pump and on the same side of said central support, each gear being placed between two respective eccentric masses, said gears engaging each other, one of said gears being configured to be driven by a corresponding gear on a drive shaft.

2. The balancing system of claim 1, wherein said central support is centrally positioned under said driving shaft inside the engine oil sump, and wherein the rotation of said two pair of counter rotating eccentric masses is driven by said driving shaft with twice its frequency of rotation.

3. The balancing system of claim 2 wherein said two pairs of counter rotating eccentric masses have equal value on said two opposite sides of the central support.

4. The balancing system of claim 1 wherein:
   the pair of eccentric masses on one side of the support are held by respective hubs on which the driving means of the pair of eccentric masses rotation are fixed, said driving means being suitable to engage a geared portion of said
   the other pair of eccentric masses on the other side of the central support are held by their respective shafts;
   the central support is provided with through cross holes, which allow the passage of said shafts coaxially fixed to the hubs of the respective pair of eccentric masses on the opposite side.

5. The balancing system of claim 4, wherein said driving means of the eccentric masses rotation are gear wheels or pulleys.

6. The balancing system of claim 4, wherein in order to ensure the correct rotation phase of the masses, centering pins are present and fit in appropriate blind holes on the terminal sides of the shafts and in corresponding contact points of the hubs.

7. The balancing system of claim 4, wherein in order to ensure the correct rotation phase of the masses, raised parts are present on the terminal sides of the shafts or of the hubs and fit in appropriate recesses on the hubs or on the shafts.

8. The balancing system of claim 4, further comprising bushes or roller bearings inserted in the holes of the central support, in order to facilitate the rotation of the shafts.

9. The balancing system of claim 8, further comprising a canalization internal to the central support in order to bring lubricating oil to said bushes or roller bearings.

10. The balancing system of claim 1, further comprising a lower protection sump.

11. Inline-four internal combustion engine, with cylinder ignition sequence 1-3-4-2, comprising a counter rotating mass system to balance second-order alternate forces produced on the driving shaft of said engine, as in claim 1.

* * * * *